US006852137B2

(12) United States Patent  (10) Patent No.: US 6,852,137 B2
Miki et al.  (45) Date of Patent: Feb. 8, 2005

(54) METHOD FOR MANUFACTURING SOLID ELECTROLYTIC CAPACITOR

(75) Inventors: Katsumasa Miki, Hirakata (JP); Yuji Mido, Higashiosaka (JP); Tatsuo Fujii, Osaka (JP); Makoto Nakano, Neyagawa (JP); Suzushi Kimura, Toyonaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 108 days.

(21) Appl. No.: 10/363,132
(22) PCT Filed: Jul. 16, 2002
(86) PCT No.: PCT/JP02/07218
§ 371 (c)(1),
(2), (4) Date: Apr. 10, 2003
(87) PCT Pub. No.: WO03/009320
PCT Pub. Date: Jan. 30, 2003

(65) Prior Publication Data
US 2003/0182781 A1 Oct. 2, 2003

(30) Foreign Application Priority Data
Jul. 17, 2001 (JP) ........................................ 2001-216351

(51) Int. Cl.$^7$ ........................... H01G 9/00; H01G 4/228; H01G 9/10
(52) U.S. Cl. ...................... 29/25.03; 361/520; 361/540
(58) Field of Search ............................. 29/25.01–25.03; 361/509, 529, 520, 540

(56) References Cited

U.S. PATENT DOCUMENTS

| 5,377,073 | A | | 12/1994 | Fukaumi et al. | |
|---|---|---|---|---|---|
| 6,239,965 | B1 | * | 5/2001 | Shiraishi et al. | 361/511 |
| 6,275,729 | B1 | * | 8/2001 | O'Phelan et al. | 607/5 |
| 6,466,430 | B2 | * | 10/2002 | Mido et al. | 361/529 |
| 6,510,045 | B2 | * | 1/2003 | Mido et al. | 361/529 |

FOREIGN PATENT DOCUMENTS

| JP | 409213587 A | * | 8/1997 |
|---|---|---|---|
| JP | 11-274002 | | 10/1999 |
| JP | 2000-49054 | | 2/2000 |

* cited by examiner

Primary Examiner—Ha Tran Nguyen
(74) Attorney, Agent, or Firm—Parkhurst & Wendel, L.L.P.

(57) ABSTRACT

A method for manufacturing solid electrolytic capacitor that can be mounted direct on a semiconductor component and offers a superior high frequency characteristic. An aluminum foil 20 is provided on one surface with a resist film 23 and then with a through hole 24. Next, an insulation film 25 is formed to cover the other surface of aluminum foil 20 and to fill the first through hole, and then the resist film 23 is removed; and then the surface of aluminum foil 20 is roughened to be provided with a dielectric layer 27 thereon. A second through hole 36 is formed in the insulation film 25, which is filling the first through hole 24. A through hole electrode 28 is formed in the second through hole; and then, on the surface of the dielectric layer 27, a solid electrolytic layer 29 and a collector layer 30 are formed. After an opening 37 is provided, a first connection terminal 31 is formed therein, and a second connection electrode 32 on the exposed surface of the through hole electrode 28.

17 Claims, 8 Drawing Sheets

METHOD FOR MANUFACTURING SOLID ELECTROLYTIC CAPACITOR

TECHNICAL FIELD

The present invention relates to a method for manufacturing solid electrolytic capacitor for use in various kinds of electronic apparatus.

BACKGROUND ART

As a result of downsizing and sophistication in the performance of electronic apparatus, solid electrolytic capacitors (hereinafter referred to as SEC), which being electronic components, are requested to be compact yet having a larger capacitance, a lower ESR (Equivalent Series Resistance) and a lower ESL (Equivalent Series Inductance). A technology for the larger capacitance and the lower ESR of SEC is disclosed in the U.S. Pat. No. 5,377,073 and the Japanese Patent Laid-open No. H11-274002, which are related to a chip-type capacitor with laminated capacitor elements. In conventional SECs, a foil or sintered substance of a valve action metal such as aluminum, tantalum, etc. is used for the electrode, and a dielectric layer is formed on the surface of the metal foil or the sintered substance, and a solid electrolytic layer is formed on the surface. Further on the surface of solid electrolytic layer, a collector layer and an electrode layer are provided to complete a capacitor element. The electrode portion and the electrode layer of capacitor element are connected to the respective connection terminals, and a package is provided in a manner so that the connection terminals are accessible from outside. A conventional finished SEC is thus manufactured.

When mounting a conventional SEC on the surface of a circuit board in the same way as semiconductor components, however, it needs the help of external terminals.

Under such a way of connection, the high frequency characteristic can not avoid being influenced by not only the conduction route to the connection terminal from the electrode portion, electrode layer, but also it is influenced by the wiring portion of circuit board.

As a result, the ESL goes up making it difficult to improve the high frequency characteristic. The present invention addresses the above-described problem, and aims to offer a method for manufacturing SECs which can be connected direct with semiconductor components and implements a low ESR and a low ESL offering a favorable high frequency characteristic.

DISCLOSURE OF THE INVENTION

A method for manufacturing SEC in accordance with the present invention comprises the steps of providing a resist film on one of the surfaces of an aluminum foil, forming a first through hole at a certain specific location of said aluminum foil, forming an insulation film covering the other surface which is opposite to the one having said resist film and filling said first through hole of said aluminum foil, roughening said aluminum foil in the region where said resist film used to be and removed, forming a dielectric layer on the roughened surface of said aluminum foil, forming a second through hole in said insulation film which is filling said first through hole, forming a solid electrolytic layer on the surface of said dielectric layer in succession to formation of a through hole electrode in said second through hole, forming a collector layer on the surface of said solid electrolytic layer, forming an opening in said insulation film, forming a first connection terminal at said opening, and forming a second connection terminal on the exposed surface of said through hole electrode.

BEST MODE FOR CARRYING OUT THE INVENTION

Figure 1:
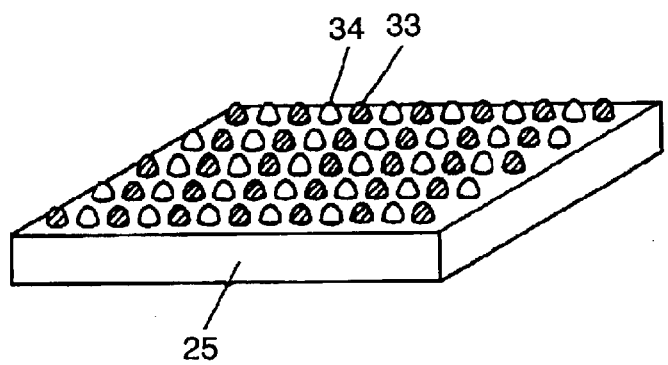
FIG. 1 is a perspective view of an SEC manufactured in accordance with a first exemplary embodiment of the present invention.

Method for manufacturing solid electrolytic capacitor (SEC) is described in accordance with exemplary embodiments of the present invention, referring to the drawings. The drawings are aimed to present the concepts, not to exhibit precise dimensions.

(Embodiment 1)

Figure 2:
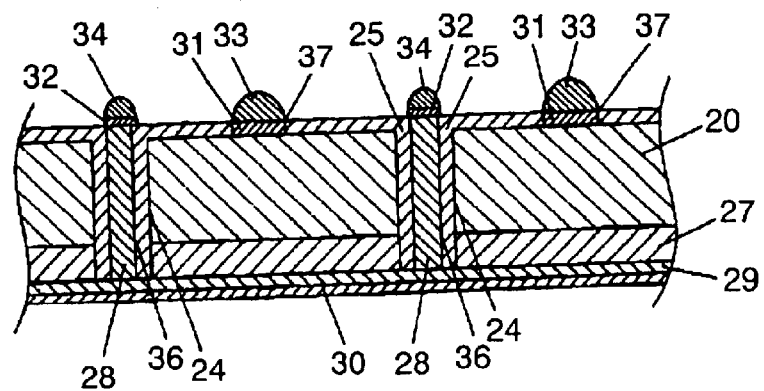
FIG. 2 is a cross sectional view of an SEC in the first embodiment.
Figure 3:
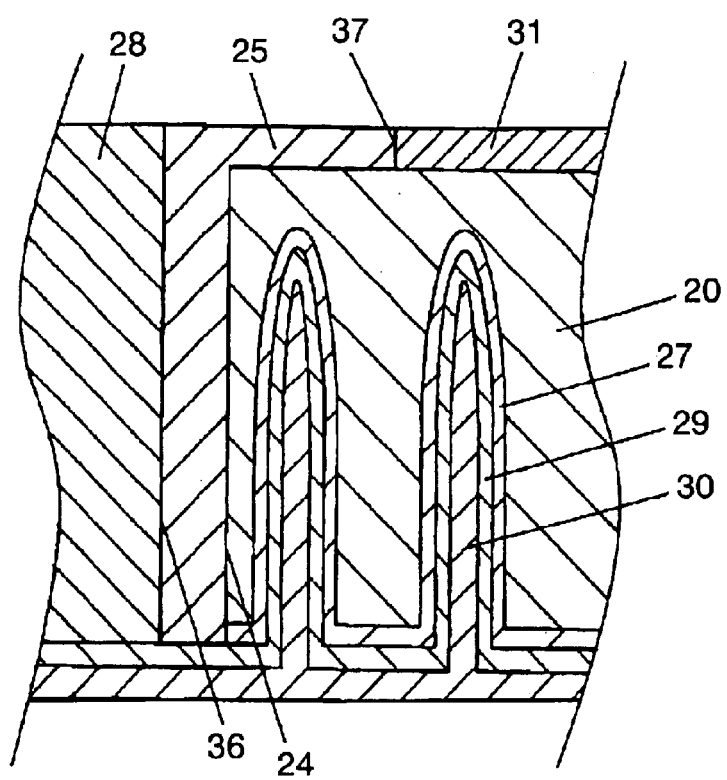
FIG. 3 is a cross sectional magnified view of an SEC, showing the key portion in the first embodiment.

Referring to FIG. 2 and FIG. 3, an aluminum foil 20 has been roughened in one of the surfaces, and a dielectric layer 27 is formed on the roughened surface of the aluminum foil 20. Further on the surface of dielectric layer 27, a solid electrolytic layer 29, which is substantially an electrode, is provided to be functioning as a capacitor in combination with the aluminum foil 20. The surface roughening of aluminum foil 20 is aimed to expand the surface area of electrode portion, thereby increasing the static capacitance of an SEC.

Provided on the surface of the solid electrolytic layer 29 is a collector layer 30 for facilitating an easy lead-out of the electrode. The collector layer 30 is connected to a second connection terminal 32 via through hole electrode 28. The through hole electrode 28 is formed by filling a second through hole 36 with a conductive substance, which electrode is electrically insulated by an insulation film 25 from the aluminum foil 20.

A first connection terminal 31 is connected direct with the aluminum foil 20, while electrically insulated from the second connection terminal 32 by insulation film 25. The connection terminals 31 and 32 are provided respectively with connection bumps 33 and 34 for the purpose of direct connection with a semiconductor component.

Thus the first connection terminal 31 and the second connection terminal 32 are disposed on a same plane; which configuration makes it possible to connect a semiconductor component direct with an SEC. Thereby, the connecting distance between the components is remarkably shortened to a reduced ESR and ESL.

Furthermore, by disposing the connection terminals in an arrangement as shown in FIG. 1, directions of the electric current are reversed among each other; thereby, the generated magnetic fields mutually cancel to a reduced ESL.

FIGS. 4 through 15 show cross sectional views used to describe manufacturing process of an SEC.

Figure 4:
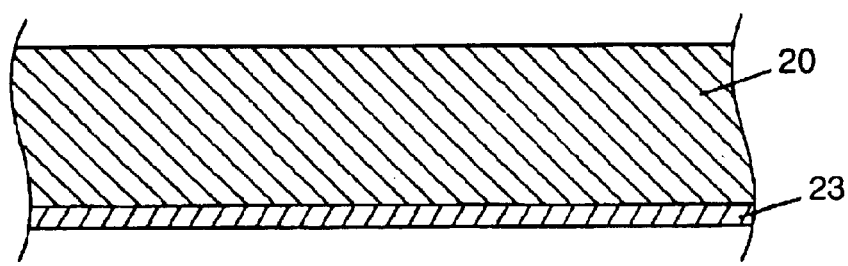
FIG. 4 is a cross sectional view of aluminum foil of an SEC, showing a state after a resist film was formed in the first embodiment.

Referring to FIG. 4, a resist film 23 is formed on one of the surfaces of aluminum foil 20. A photo sensitive resin or an adhesive organic film may be used for the resist film 23. The film may be formed easily through such methods as an immersion, a spin coating, a screen printing, a film attaching, a spraying. Whichever method of the above can readily provide a resist film 23 on one surface at a high productivity.

Figure 5:
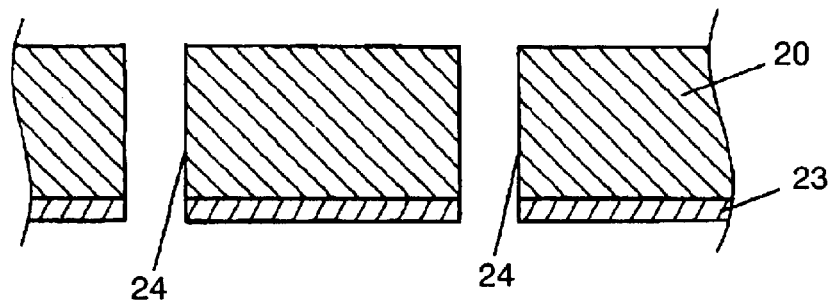
FIG. 5 is a cross sectional view of aluminum foil of an SEC, showing a state after a first through hole was formed in the first embodiment.

A photo sensitive resin is advantageous in that it is easy to apply and cure; while an organic film is advantageous in that it contributes to make the manufacturing process simple, in addition, it can be peeled off easily at a later process step. In the next step, the aluminum foil 20 is provided with a first through hole 24, as shown in FIG. 5.

The first through hole 24 can be formed at any optional location with a high precision by using at least one of the methods among a laser beam machining, a punching method, a drilling method and an electric discharge machining.

Figure 6:
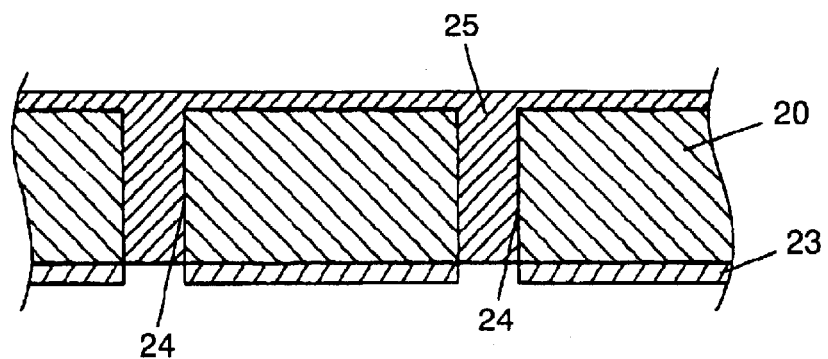
FIG. 6 is a cross sectional view of aluminum foil of an SEC, showing a state after an insulation film was formed in the first embodiment.

Next, as shown in FIG. 6, an insulation film 25 is formed on the aluminum foil 20 covering the surface opposite to the one having the resist film 23 and filling the first through hole. The material for insulation film 25 may be selected preferably among the group of an epoxy resin, a polyimide resin, a silicone resin, an acrylic resin and a phenol resin. These materials are superior in the insulating property, resistance against solvent and heat withstanding property. Furthermore, they stick fast to the aluminum foil 20, or the electrode. They not only protect the surface of aluminum foil 20 from solvent, acid, etc. used during the manufacturing process, but they also play the role of protecting an SEC from outside environments. The insulation film 25 may be formed by using at least one of the methods among an immersion, a spin coating, a screen printing, a spraying and an electrodeposition. Whichever method can readily provide an insulation film 25 evenly on the surface of aluminum foil 20. Prior to formation of the insulation film 25, the first through hole 24 of aluminum foil 20 may be chamfered around the edge. The chamfering is aimed to get rid of burr that might have emerged during formation of the first through hole 24, at the same time it improves the covering property of insulation film 25 at the other surface of aluminum foil 20, as a result it is effective to prevent possible short-circuiting between the through hole electrode 28 and the aluminum foil 20. While on the one surface of the aluminum foil 20, it improves the covering property of dielectric layer 27, which is effective to present possible short-circuiting between the solid electrolytic layer 29 and the aluminum foil 20. As the result of above-described effects, an SEC is provided with stable characteristics and the reliability is improved.

Figure 7:
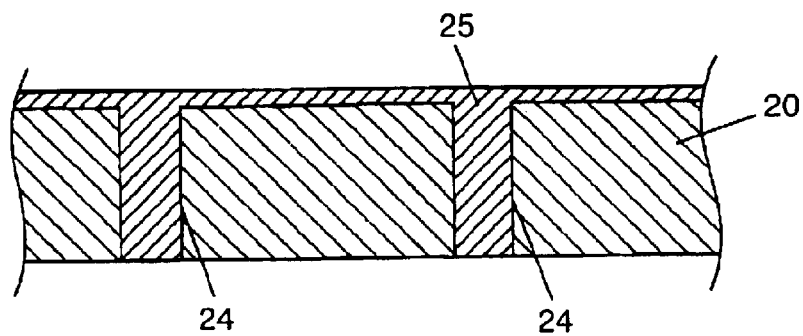
FIG. 7 is a cross sectional view of aluminum foil of an SEC, showing a state after the resist film was removed in the first embodiment.

Next, as shown in FIG. 7, the resist film 23 sticking on one of the surfaces of aluminum foil 20 is removed by, for example, immersing it in a resist remover solution.

Figure 8:
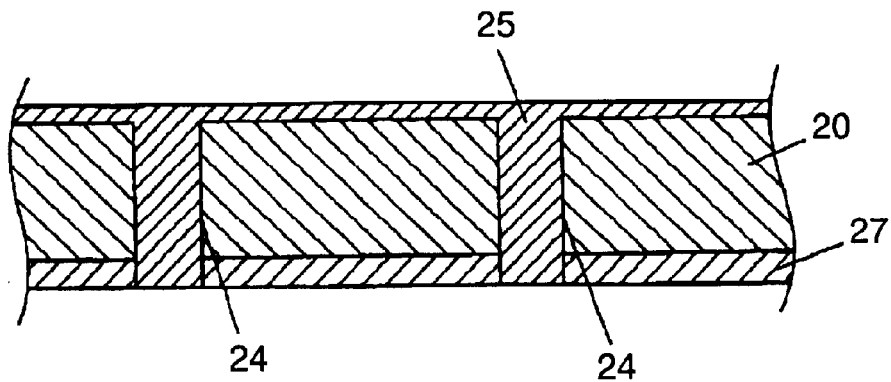
FIG. 8 is a cross sectional view of aluminum foil of an SEC, showing a state after a dielectric layer was formed on the roughened surface in the first embodiment.
Figure 9:
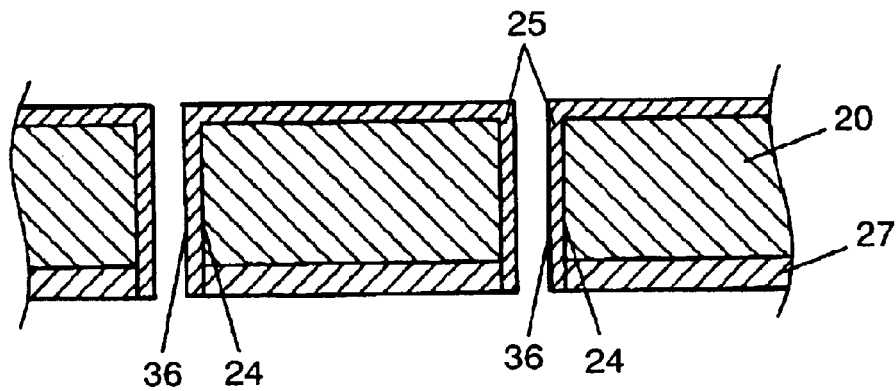
FIG. 9 is a cross sectional view of aluminum foil of an SEC, showing a state after a second through hole was formed in the first embodiment.
Figure 10:
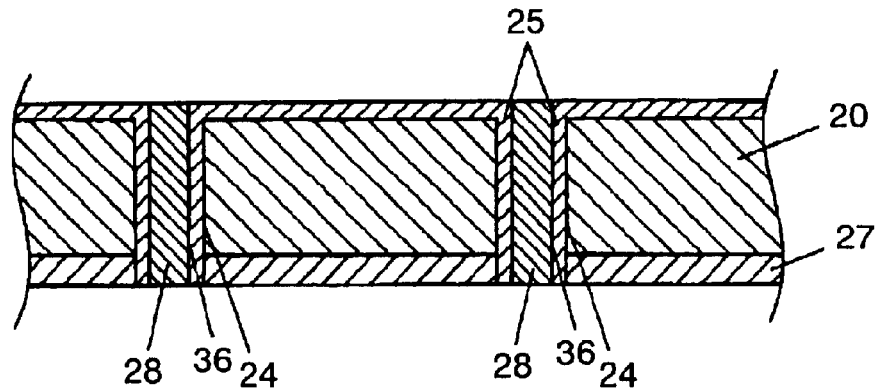
FIG. 10 is a cross sectional view of an SEC, showing a state after the second through hole was filled with a conductive substance in the first embodiment.
Figure 11:
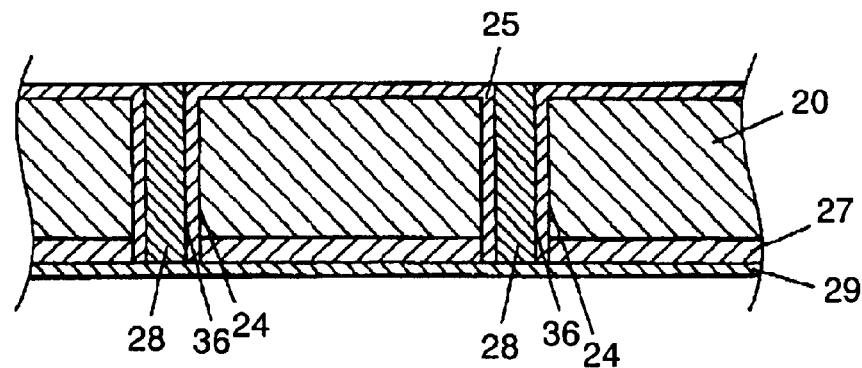
FIG. 11 is a cross sectional view of an SEC, showing a state after a solid electrolytic layer was formed on the dielectric layer in the first embodiment.

Then, as shown in FIG. 8, the surface of aluminum foil 20 is roughened by etching in a region where the resist film 23 used to be and removed, and a dielectric layer 27 is formed on the roughened surface of aluminum foil 20. The surface-roughening etching may be conducted by, for example, immersing it an acidic solution and applying a certain specific voltage thereto, or simply immersing it in an acidic solution. The formation of dielectric layer may be conducted by, for example, an anodic oxidation of the aluminum foil 20 in an aqueous solution of ammonium adipate or an aqueous solution of a mixture of boric acid and borax. FIG. 9 shows a state where a second through hole 36 was formed in the insulation film 25 so that the insulation film 25, which layer is filling the first through hole 24, is kept staying around the wall surface of first through hole 24. The second through hole 36 can be formed at a high accuracy within the insulation film filling the first through hole, by using either one of the methods among a laser beam machining, a punching and a drilling. Then, a through hole electrode 28 is formed by filling the second through hole 36 with a conductive adhesive substance and curing it, as shown in FIG. 10. This way of manufacturing can provide a through hole electrode 28 easily. Then, a solid electrolytic layer 29 is formed on the surface of dielectric layer 27, as shown in FIG. 11.

The solid electrolytic layer 29 is formed by using at least one among the group of a conductive polymer generated through a chemical polymerization of heterocyclic monomer such as pyrrol, thiophene using an oxidizing agent such as ferric sulfate, or through an electrolytic polymerization where the aluminum foil 20 is immersed in a heterocyclic monomer solution and applied with a voltage therein; manganese dioxide generated by heat-decomposing manganese nitrate; a coated film formed by applying a suspension of powdered conductive polymer; and a coated film formed by applying an aqueous solution of conductive polymer.

The conductive polymer which has been made available through one of the above processes may be formed on the surface of dielectric layer 27 after the layer is provided with manganese dioxide on the surface.

The above process provides the conductive polymer homogeneously and intensely. By using the above-described material and procedure, solid electrolytic layer 29 can be provided even on the surface of dielectric layer 27 that has been formed in the micro etching pits generated as a result of the roughening operation. Thus it contributes to a higher static capacitance of an SEC.

Figure 12:
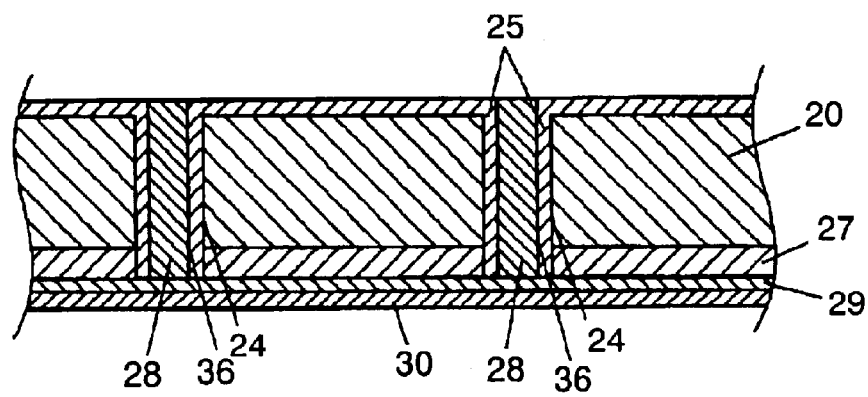
FIG. 12 is a cross sectional view of an SEC, showing a state after a collector layer was formed in the first embodiment.
Figure 13:
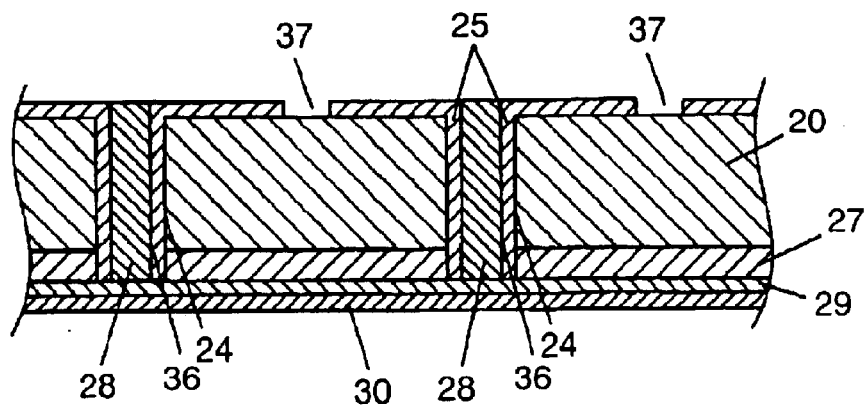
FIG. 13 is a cross sectional view of an SEC showing a state after an opening was formed in the first embodiment.

Furthermore, in a case where the solid electrolytic layer 29 is formed using an organic material, the layer is soft and flexible and can withstand possible damage or breakage that might arise during the manufacturing process. FIG. 12 shows a state after a collector layer 30 was formed on the surface of solid electrolytic layer 29. The collector layer 30 is formed by applying at least either one among the group of a suspension of carbon particle, a conductive adhesive substance and a conductive paint. This process improves the adhesive property between the solid electrolytic layer 29, or a substantial electrode, and the collector layer 30, or an apparent electrode; thereby, the ESR is reduced and the high frequency characteristic is improved. FIG. 13 shows a state where an opening 37 was formed in the insulation film using a laser beam machining or a grinding method, for providing a first connection terminal 31 on the other surface of aluminum foil 20.

Figure 14:
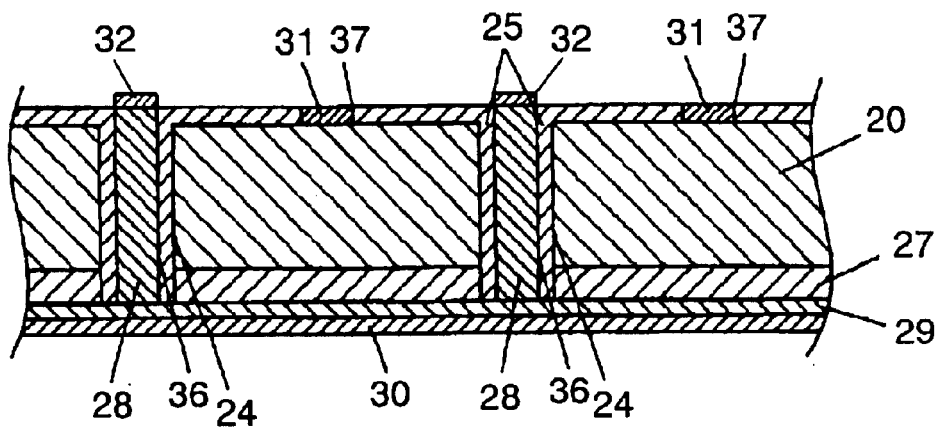
FIG. 14 is a cross sectional view of an SEC, showing a state after a first connection terminal was formed in the first embodiment.

These methods can form the opening efficiently; which contributes to a higher productivity. FIG. 14 shows a state where a first connection terminal 31 was provided in the opening 37.

The first connection terminal 31 is provided for facilitating a good contact with other component, and is connected with the aluminum foil 20.

Preferred process of forming the first connection terminal 31 includes application of conductive adhesive, electroplating, electroless plating.

Figure 15:
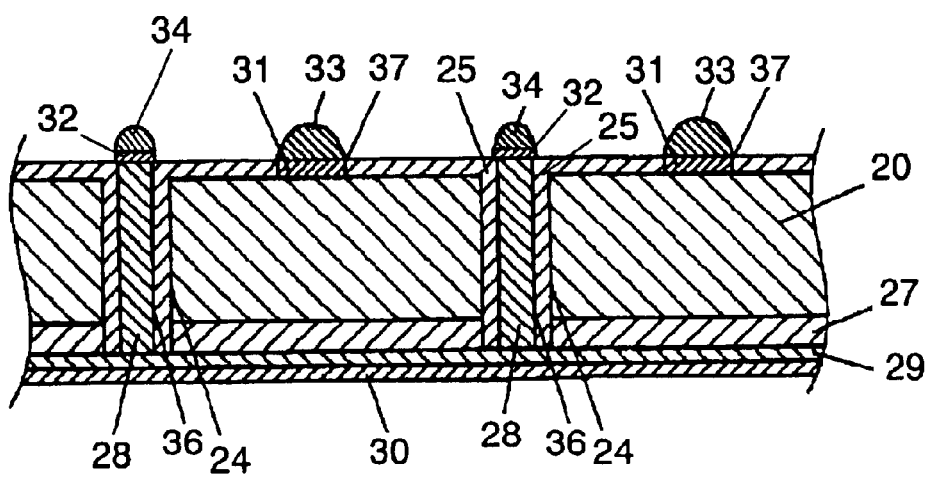
FIG. 15 is a cross sectional view of an SEC, showing a state after a connection bump was formed in the first embodiment.

The application of a conductive adhesive is advantageous in increasing the manufacturing productivity, because of its easiness of application and curing. In the case of electroplating and electroless plating, since it is already covered with the insulation film 25 except the opening 37 and the exposed portion of through hole electrode 28, the first connection terminals 31 can be provided altogether evenly with ease by covering the exposed surface of through hole electrode 28 and the whole reverse surface of collector layer 30 with an insulation tape or the like item. Depending on the needs of insuring a better connection with semiconductor component, a second connection terminal 32 may be provided on the exposed surface of through hole electrode 28 by electroplating, electroless plating or other process. When forming the second connection terminal 32, the first connection terminals 31 and the second connection terminals 32 can be formed altogether by simply covering the entire reverse surface of collector layer 30 with the above-described insulation tape or the like item. FIG. 15 shows a state where a first connection bump 33 and a second connection bump 34, which are made of at least one among the group of solder, gold, tin and silver, were provided on the first connection terminal 31 and the second connection terminal 32, respectively, which were illustrated in FIG. 14. A second connection bump may be formed direct, eliminating the second connection terminal 32.

Since the connection terminals are disposed on a same plane, it can be connected direct with a semiconductor component. Thus the above-described method of manufacture readily implements a low ESR and a low ESL, and offers an SEC of superior high frequency characteristics.
(Embodiment 2)

Figure 16:
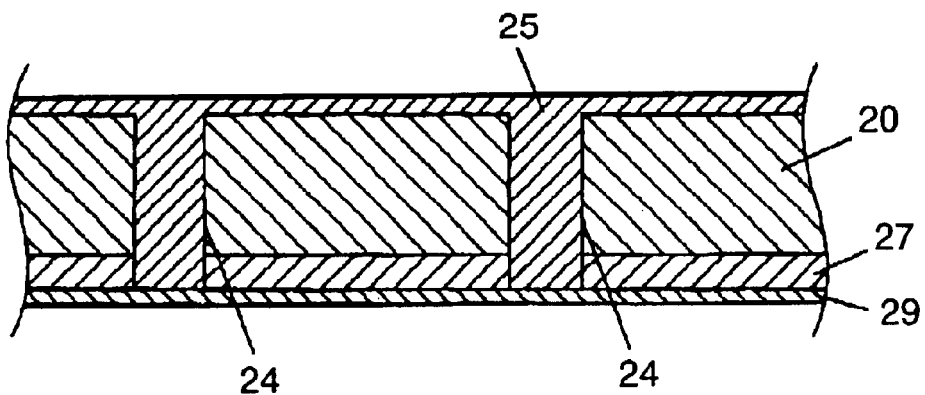
FIG. 16 is a cross sectional view of an SEC, showing a state after a solid electrolytic layer was formed on a dielectric layer in a second exemplary embodiment.

FIG. 16 shows a state where a solid electrolytic layer 29 was formed on the surface of dielectric layer 27, which had been formed on the roughened surface of aluminum foil 20 as illustrated in FIG. 8 in the embodiment 1.

The solid electrolytic layer 29 is formed through the same process as in the embodiment 1. The point of difference from the embodiment 1 is that in the present embodiment 2 no through hole electrode 28 is yet provided at the present stage; this arrangement has the following advantage. Since the through hole electrode 28 is formed of a conductive adhesive substance, it can be ill-affected by solvent, etc. used for forming the solid electrolytic layer 29; viz. the through hole electrode might get swollen, eroded, or flaked off.

So, a range of selecting materials for the conductive adhesive substance would eventually be limited.

Figure 17:
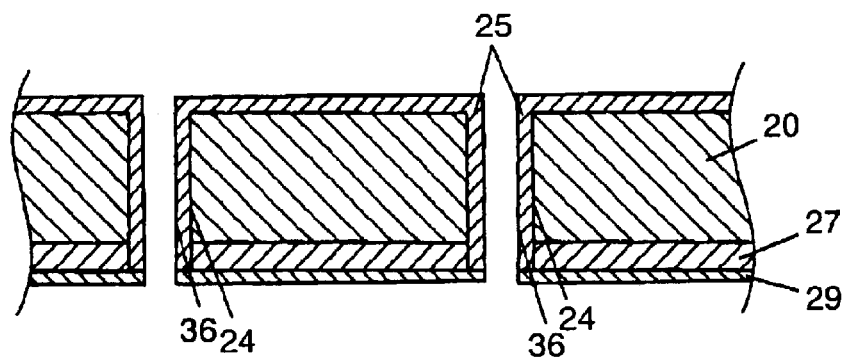
FIG. 17 is a cross sectional view of aluminum foil of an SEC, showing a state after a second through hole was formed in the second embodiment.
Figure 18:
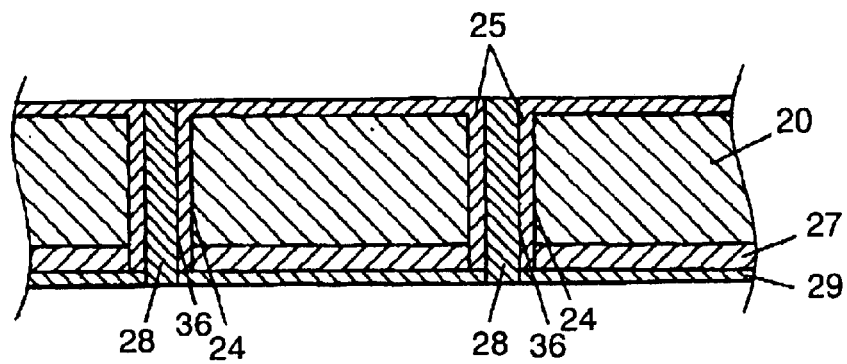
FIG. 18 is a cross sectional view of an SEC, showing a state after a second through hole was filled with a conductive substance in the second embodiment.

However, in the manufacturing method in accordance with the present embodiment 2 where the solid electrolytic layer 29 is provided first and then a through hole electrode 28 is formed, the above-described influence by solvent, etc. does not need to be taken into account. Therefore, the conductive adhesive substance can be selected from among a wider range of candidate materials. Then, as shown in FIG. 17, a second through hole 36 is formed by a laser beam machining, a punching method, a drilling method, or an electric discharge machining, etc. The second through hole 36 is filled with a conductive adhesive substance, as shown in FIG. 18, and then it is cured to provide a through hole electrode 28.

Figure 19:
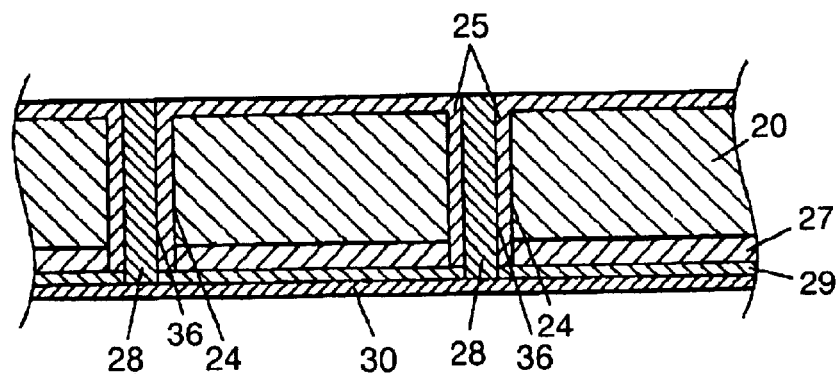
FIG. 19 is a cross sectional view of an SEC, showing a state after a collector layer was formed in the second embodiment.

FIG. 19 shows a state where a collector layer 30 was formed on the surface of solid electrolytic layer 29. The point of difference from that of the embodiment 1 shown in FIG. 12 is that while the through hole electrode 28 in FIG. 12 is connected with solid electrolytic layer 29, the through hole electrode 28 in FIG. 19 is connected also to the collector layer 30 besides the solid electrolytic layer 29.

Figure 20:
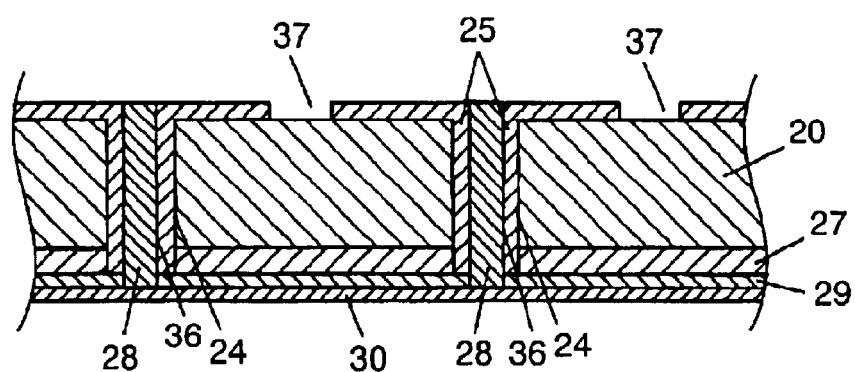
FIG. 20 is a cross sectional view of an SEC, showing a state after an opening was formed in the second embodiment.
Figure 21:
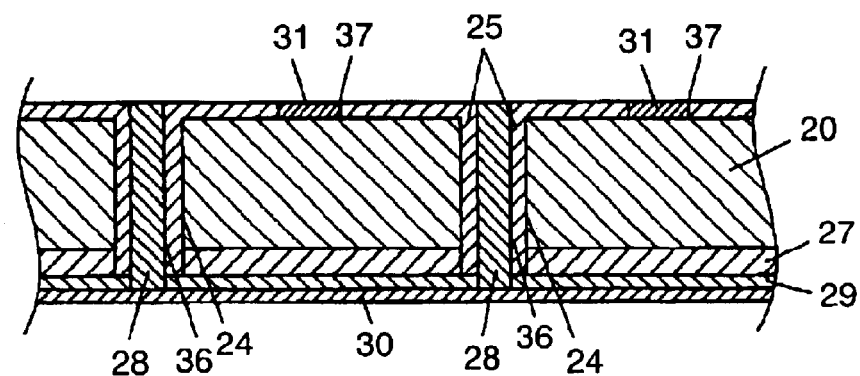
FIG. 21 is a cross sectional view of an SEC, showing a state after a first connection terminal was formed in the second embodiment.

Thus the ESR is further reduced, and the high frequency characteristic is improved. And then, an opening 37 is formed as shown in FIGS. 20 and 21 by the same process as in the embodiment 1, and a first connection terminal 31 is provided in the opening 37 to obtain an SEC.

A feature point of the manufacturing method in accordance with the present invention is that it uses an aluminum foil before etching as the starting material. It has following advantages: After the first through hole 24 having been formed in the aluminum foil 20, in a step for removing the resist film 23 which is staying on one surface of the aluminum foil, an acidic solution or an alkaline solution may be used, besides organic solvent, as the resist remover in the present method of manufacture. If an acidic solution or an alkaline solution is used for removing the resist film 23 in a case where an aluminum foil 20 already having a roughened surface is employed as the starting material, the solution may dissolve also the roughened surface of aluminum foil 20, besides the resist film 23 staying on one surface. The dissolved surface of aluminum foil may lead to a deteriorated static capacitance of an SEC.

In the manufacturing method of the present invention, however, the etching is applied after the resist film 23 formed on one surface of aluminum foil 20 is removed. So, there can be no such worry as described in the above, and a resist remover can be selected from among a wider range of candidate materials.

Furthermore, in a case where the manufacturing is conducted in accordance with the present embodiment 2, a conductive adhesive substance may be selected from among a wider range of candidate materials.

Thus the present invention offers a wide range of freedom in the process designing, making the manufacturing of SEC easy. The SEC manufactured in accordance with the present invention provides following advantages: Since the first connection terminal and the second connection terminal are disposed on a same plane, it can be connected direct with a semiconductor component as the source of power supply, and it has a superior high frequency characteristic either.

Furthermore, since the dielectric substance formed of an organic material is rich in flexibility, it can be mounted even on a circuit or a substrate which is exposed to a bending stress. The mounting on such a circuit or a substrate was substantially impossible. Still further, it can be buried in such a substrate with ease. Thus the SECs make a certain contribution to downsizing of apparatus.

INDUSTRIAL APPLICABILITY

As described in the above, the present invention offers a wide range of freedom in designing the process. Consequently, the SECs can be manufactured with ease at a high precision level. At the same time, the manufacturing method of the present invention implements a high productivity in the manufacturing operation. Thus it provides a certain value in the industry.

What is claimed is:

1. A method for manufacturing solid electrolytic capacitor comprising the steps of;

forming a resist film on one of the surfaces of an aluminum foil, forming a first through hole at a certain specific location of said aluminum foil, forming an insulation film covering the other surface which is opposite to the one having said resist film and filling said first through hole of said aluminum foil, roughening the surface of said aluminum foil in the region where said resist film used to be and removed, forming a dielectric layer on the roughened surface of said aluminum foil, forming a second through hole in said insulation film filling said first through hole, forming a through hole electrode in said second through hole and then forming a solid electrolytic layer on the surface of said dielectric layer, forming a collector layer on the surface of said solid electrolytic layer, forming an opening in said insulation film, forming a first connection terminal at said opening, and forming a second connection terminal on exposed surface of said through hole electrode.

2. The method for manufacturing solid electrolytic capacitor recited in claim 1, wherein said first through hole is formed by using at least one of the methods among a laser beam machining, a punching method, a drilling method and an electric discharge machining.

3. The method for manufacturing solid electrolytic capacitor recited in claim 1, wherein said second through hole is formed by using at least one of the methods among a laser beam machining, a punching method and a drilling method.

4. The method for manufacturing solid electrolytic capacitor recited in claim 1, wherein said resist film is formed in succession to an edge chamfering on said first through hole.

5. The method for manufacturing solid electrolytic capacitor recited in claim 1, wherein said insulation film is formed of at least one among an epoxy resin, a polyimide resin, a silicone resin, an acrylic resin and a phenol resin.

6. The method for manufacturing solid electrolytic capacitor recited in claim 1, wherein said insulation film is formed by using at least one method among an immersion process, a spin coating, a screen printing method, a spray process and an electrodeposition.

7. The method for manufacturing solid electrolytic capacitor recited in claim 1, wherein said resist film is at least one among a photo sensitive resin and an adhesive organic film.

8. The method for manufacturing solid electrolytic capacitor recited in claim 1, wherein said resist film is formed by using at least one method among an immersion process, a spin coating, a screen printing method, a film attaching method, a spray process and an electrodeposition.

9. The method for manufacturing solid electrolytic capacitor recited in claim 1, wherein said through hole electrode is formed by filling a conductive adhesive substance and then curing it.

10. The method for manufacturing solid electrolytic capacitor recited in claim 1, wherein the material forming said first and said second connection terminals is a conductive adhesive substance.

11. The method for manufacturing solid electrolytic capacitor recited in claim 1, wherein said first and said second connection terminals are formed by using at least one method among an electroplating and an electroless plating.

12. The method for manufacturing solid electrolytic capacitor recited in claim 1, wherein the material constituting said solid electrolytic layer is a composite containing at least one material among a π-electron conjugated polymer and a conducting polymer other than that.

13. The method for manufacturing solid electrolytic capacitor recited in claim 1, wherein said solid electrolytic layer is formed by using at least one of the methods among a chemical polymerization where a heterocyclic monomer is polymerized with an oxidizing agent, an electrolytic polymerization where a heterocyclic monomer is polymerized by applying a voltage, an application of a suspension of conducting polymer particles, an application of an aqueous solution of conducting polymer and a thermal decomposition of manganese nitrate.

14. The method for manufacturing solid electrolytic capacitor recited in claim 1, wherein said solid electrolytic layer is formed by using at least one of the methods among a chemical polymerization where manganese dioxide is generated by thermal decomposition of manganese nitrate and then polymerizing a heterocyclic monomer using an oxidizing agent, an electrolytic polymerization where a heterocyclic monomer is polymerized by applying a voltage, an application of a suspension of conducting polymer particles and an application of an aqueous solution of conducting polymer.

15. The method for manufacturing solid electrolytic capacitor recited in claim 1, wherein said opening is formed by using at least one of the methods among a laser beam machining and a grinding method.

16. The method for manufacturing solid electrolytic capacitor recited in claim 1, wherein the material of said collector layer is at least one of the materials among a suspension of carbon particles, a conductive adhesive substance and a conducting paint.

17. A method for manufacturing solid electrolytic capacitor comprising the steps of;

forming a resist film on one of the surfaces of an aluminum foil, forming a first through hole at a certain specific location of said aluminum foil, forming an insulation film covering the other surface which is opposite to the one having said resist film and filling said first through hole of said aluminum foil, roughening the surface of said aluminum foil in the region where said resist film used to be and removed, forming a dielectric layer on said roughened surface of said aluminum foil, forming a solid electrolytic layer on the surface of said dielectric layer and then forming a second through hole in said insulation film and then forming a through hole electrode in said second through hole, forming a collector layer on the surface of said solid electrolytic layer, forming an opening in said insulation film, forming a first connection terminal at said opening, and forming a second connection terminal on exposed surface of said through hole electrode.

* * * * *